United States Patent [19]

DeRogatis

[11] 4,222,276
[45] Sep. 16, 1980

[54] VACUUM PACKING APPARATUS

[76] Inventor: Ronald A. DeRogatis, P.O. Box 4943, Ft. Lauderdale, Fla. 33338

[21] Appl. No.: 956,948

[22] Filed: Nov. 2, 1978

[51] Int. Cl.³ .............................................. G01L 7/16
[52] U.S. Cl. ..................................... 73/714; 73/744; 99/472
[58] Field of Search ................. 53/79, 84, 88; 99/472; 73/714, 744; 137/846

[56] References Cited

U.S. PATENT DOCUMENTS

| | | | |
|---|---|---|---|
| 820,987 | 5/1906 | Perotti | 137/846 |
| 1,347,194 | 7/1920 | Washington | 99/472 |
| 1,572,190 | 2/1926 | Don | 53/79 |
| 2,087,963 | 7/1937 | Baxter | 99/472 |
| 2,155,397 | 4/1939 | Brandon | 99/472 |
| 2,669,176 | 2/1954 | Lazerus | 99/472 |

Primary Examiner—Donald O. Woodiel
Attorney, Agent, or Firm—Robert D. Farkas

[57] ABSTRACT

A vacuum packing apparatus utilizes a container lid for attachment to a container having food therein. The lid is provided with a check valve having a hose fitting which provides a source of vacuum to the container. The lid carries an indicating apparatus whose housing is attached to the lid and gaseously communcating to the container associated therewith. A coil spring is mounted in the housing and biases a piston rod outwardly from the housing. The rod of the piston carries indicia suggesting the vacuum level within the container. One embodiment provides a novel valve apparatus suitable for allowing the container to achieve atmospheric pressure upon simple manual manipulation thereof.

9 Claims, 5 Drawing Figures

VACUUM PACKING APPARATUS

BACKGROUND OF THE INVENTION

1. The Field of the Invention

This invention relates to vacuum packing devices and more particularly to that class of indicator serving the dual purpose of being carried by a vacuumized container and containing a manually manipulible valve body portion thereon.

2. Description of the Prior Art

The prior art abounds with containers having air exhausting apparatus associated therewith.

U.S. Pat. No. 1,572,190, issued Feb. 9, 1926, to W. Don teaches a fruit preserver wherein the lid of the preserver and the marginal edges of the container associated therewith provides a port to which a flexible hose is removably engaged for operation by a hand pump, carrying a gauge thereon. Once the container is vacuumized, the gauge is removed from the container and the lid and fails to indicate the pressure level within the container.

U.S. Pat. No. 2,087,963, issued July 27, 1937 to D. E. Baxter, discloses:

a. Flip trouble operated pump associated with a stand having a stopper arrangement adapted to engage the mouth portions of a container to be vacuumized.

b. The tubing portions of the stationary apparatus includes a pressure gauge permanently coupled thereto so as to permit the user to measure the negative pressure achieved within the container. Once vacuumized the container is removed from the stand portion and carries no signaling device to indicate the level of negative pressure therewithin.

U.S. Pat. No. 2,155,397, issued Apr. 25, 1939, to W. D. Brandon, describes a container and an apparatus associated therewith for exhausting air from the container. Such apparatus includes a capping arrangement adapted to sit over the container cap to which a portion of tubing is coupled to a vacuum gauge installed on the vacuum line. Once the desired degree of negative pressure has been achieved within the container, the container lid is closed and the apparatus remains in assembled form, permitting the container to be removed therefrom, in a completely sealed condition. Removing the container lid requires supplemental machinery because of the negative pressure tending to maintain the lid securely on or adjacent to the open mouth portion of the container. The gauge portion of the Brandon apparatus is only useful during the vacuumizing process and fails to indicate the continued state of negative pressure within the container once the container has been processed utilizing the Brandon apparatus.

SUMMARY OF THE INVENTION

A primary object of the present invention is to provide an apparatus which may be carried by the vacuumized container so as to continually indicate the pressure state within the container.

Another object is to provide an inexpensive vacuum indicator, useful for industrial and home use, which may be either fabricated as a portion of a lid or attached thereto.

Still another object is to provide a vacuum indicating device which is suitable to readily indicate the degree of required negative pressure for various types of foods designed to be stored within the container.

Yet another object is to provide an indicating apparatus which also serves the purpose of relieving the negative pressure within the container both during the vacuumizing process or when it is desired to open the container closure device.

A further object is to provide a vacuum indicator and associated relief valve mechanism which is inexpensive to manufacture, simple to use, and reliable in nature.

Heretofore, canning operation, both of the industrial variety or in home services, required complex, expensive machinery when high vacuum levels were utilized. Such devices satisfactorily closed the container lid and established the negative pressure within the container to any required degree, usually indicated on a gauge, when the container and lid apparatus was installed temporarily in the packing apparatus. Once such container was closed and vacuumized, the user had no method of knowing the level of negative pressure in the container. The only guarantee that there was some negative pressure remaining was to attempt to detect the presence of sound, upon opening the container, indicating the inrush of air into the container. Such sound unreliably indicated the amount of negative pressure in the container, upon its opening. Furthermore, opening up a container, having a lid of substantial area, when such container was subjected to atmospheric pressure on the outside and high vacuum levels on the inside, represented a chore not easily accomplished.

The present invention contemplates these problems and provides a sensible and economical solution thereto. An inexpensively fabricated valve and indicating apparatus is attached either to the container or to the lid portions thereof in a permanent fashion. A check valve is provided for use in coupling a vacuum line to the container, such that when the vacuum line is removed, the check valve closes thereby prohibiting air from entering the closed, vacuumized container. An indicator is utilized which signals at all times, the level of negative pressure remaining in the container, or achieved during the vacuumizing process. The housing, including the indicator, is also provided with a valve which when easily manipulated, permits air to enter the vacuumized container, thereby either moderating the negative pressure contained therein during the packing process, or totally normalizing the vacuum level within the container to an atmospheric pressure level, thus permitting the user to easily remove the lid portion of the container and gain access to the contents thereof.

These objects, as well as other objects of the present invention, will become more readily apparent after reading the following description of the accompanying drawings.

DESCRIPTION OF THE PREFERRED EMBODIMENT

Figure 1:
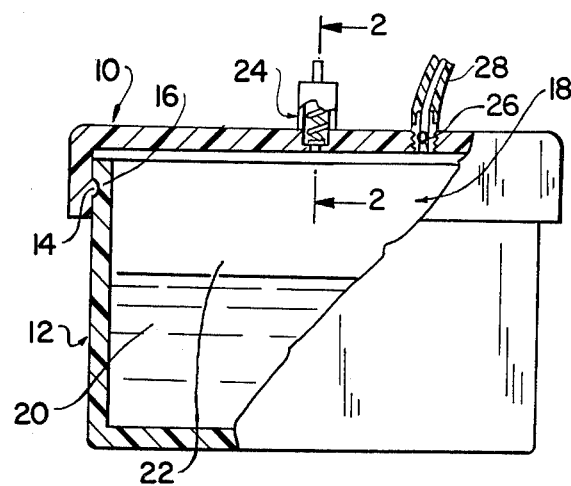
FIG. 1 is a side elevation view of the present invention shown secured to the lid of a container.

The structure and method of fabrication of the present invention is applicable to a vacuum packing apparatus having a container and lid in which material is to be placed and subjected to a negative pressure when stored over long time periods therein. Such container and lid is provided, in one location thereof, having a check valve which is adapted to permit the valve stem to be coupled to a vacuum line in removable fashion. The relief valve permits negative pressure, experienced within the vacuum line, to be coupled through the open valve into the confines of the container. When the vacuum line is decoupled from the relief valve, in conventional fashion, the relief valve closes, thereby preventing the ingress of atmospheric air into the closed vacuumized container. Associated therewith is a indicator housing, preferably fabricated as part of the lid of the apparatus, though capable of being fabricated from a separate material and affixed thereto by any convenient means, such as by the process of heat sealing. Such housing is preferably fabricated from a plastic material such as polyvinychloride. The housing has an opening therein, which fluidly communicates to the interior of the container or, when attached to the lid, or being apart thereof, communicates to an interior surface of the lid, adapted to be located adjacent to the open mouth portion of the container. The housing is also provided with another opening extending outwardly from the body of the container. A coil spring, fabricated from any conventional material, such as stainless steel, is housed within the cavity of the housing, having one end thereof being disposed adjacent to the opening in the housing which communicates to the interior of the container. The other end of the coil spring engages a plunger slidably engaged within the walls of the cavity of the housing. Such plunger forms a vacuum-tight fit with the walls of the cavity. Attached to the plunger is a rod having a portion thereof residing at all times passing through the lid located outwardly from the lid. In operation, when the container is subjected to a vacuumizing force, the plunger is caused to override the bias forces exerted by the coil spring, so as to permit the plunger to move towards the interior of the container carrying the rod along with it. Thus, portions of the rod will extend outwardly of the housing as a function of the amount of negative pressure experienced by the interior of the container.

Indicia is carried by the rod, utilizing such words as fruit, meat, liquid, solid and the like. Annular gradation lines may also be employed, so as to indicate to a user the vacuum level within the container, useful for the packaging of a wide variety of foods or other different materials therein. The gradation lines also serve the same purpose. From a distance, the user can easily determine the amount of extension of the outwardly extending portions of the rod, from the exterior surface of the housing, thereby enabling the user to immediately detect a container whose interior has inadvertently lost its negative pressure. Such apparatus is also useful in identifying the type of food or other material housed within the container by utilizing the word-type indicia disposed on the exterior surface of the rod adjacent the exterior surface of the housing.

An embodiment of the aforementioned indicating apparatus includes a check valve disposed secured to the housing and extending outwardly therefrom. Such check valve is in the form of a rubber-like tubing having its free end disposed in a flattened shape so as to have the interior surfaces of the passageway defined therewithin, disposed in touching engagement along a flat plane. Such tubing may in fact be a rubber material, or if desired, may be fabricated from a resilient plastic material such as a plasticized polyvinylchloride. An opening, in the wall of the housing, communicates to the proximal end of the flexible tubing. In use, the flexible relief valve is maintained in its closed position, as is determined by its natural state, during the vacuumizing process. In the event that the negative pressure level within the container achieves an excessive amount, the edges of the flattened portion of the flexible tubing are squeezed together so as to cause the flattened portions to open, allowing atmospheric pressure to enter the confines of the container. Upon release, the flattened end of the flexible tubing is caused to be reflattened and the container maintains its vacuumized state. When it is desired to open the container, further manipulation of the flattened ends, permits atmospheric air to enter the container, causing the container to return to atmospheric pressure levels and thus, permitting the lid of the container to be easily removed therefrom.

Now referring to the Figures, and more particularly to the embodiment illustrated in FIG. 1 showing lid 10 shown removably secured to container 12, utilizing protrusions 14, disposed in annular fashion, engaged within annular groove 16 adjacent the mouth portion 18 of container 12. Liquid 20, shown within container 12, depicts a food preparation or other material, which is to be stored within container 12. Area 22 is air, when lid 10 is removed from covering of the mouth portion 18. Housing 24 is shown secured to lid 10, as well as check valve 26. It should be understood that housing 24 and check valve 26 may both, or singly, be secured either to the lid or container 12 at the will of the user. Flexible tubing 28 is secured to check valve 26 in removable fashion and in a conventional manner.

Figures 2, 3:
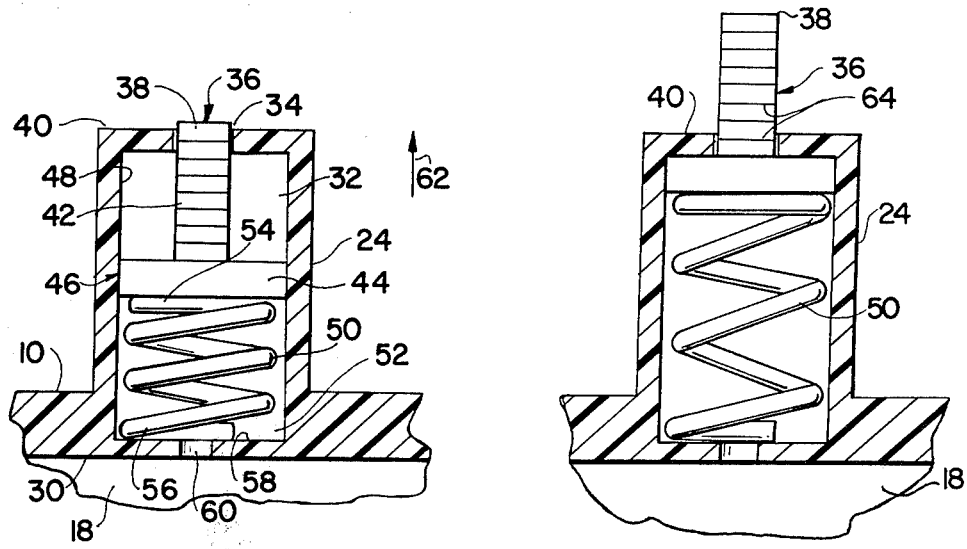
FIG. 2 is a side elevation, cross-sectional view, taken along line 2—2, using direction of arrows 2—2 of a portion of the apparatus shown in FIG. 1 when the container thereof is evacuated.
FIG. 3 is a side elevation, cross-sectional view of the apparatus shown in FIG. 2 when the pressure within the container, shown in FIG. 1, is normalized.

FIG. 2 illustrates housing 24, shown secured to a portion of lid 10. Area 18 is shown disposed below the lowermost surface 30 of lid 10. Cavity 32 is disposed within housing 24 and communicates with the exterior surfaces of housing 24 by way of opening 34. Rod 36 is shown having region 38 thereof extending outwardly from outermost surface 40 of housing 24, and having region 42 thereof disposed contained within cavity 32. Plunger 44 is shown having marginal edge 46 thereof in sliding touching engagement with interior surface 48 of cavity 24. Helical spring 50 is contained within cavity 52. Cavities 32 and 52 are separated only by plunger 44 and they operate at different pressure levels due to the intimate contact maintained by marginal edge 46 with interior surface 48. End 54, of spring 50, is in touching engagement with plunger 44 while end 56 is shown in touching engagement with the lower most interior surface 58 of cavity 52. Hole 60 communicates the interior of the container 12, shown in FIG. 1. Spring 50 exerts a bias force on plunger 44 in the direction of arrow 62. When the pressure experienced in area 18 is sufficiently low, plunger 44 is urged in the direction opposite arrow 62 and rod 36 is pulled in a similar direction so as to foreshorten the amount that portion 38, of rod 36, extends outwardly from surface 40. Thus, the apparatus as shown in FIG. 2, indicates that there is a great deal of negative pressure existing within cavity 52, as shown.

FIG. 3 is the identical housing 24 shown containing all the elements therein, as depicted in FIG. 2, excepting that the pressure available in area 18 is substantially equivalent to the air pressure residing adjacent the exterior surface 40 of the housing. When this occurs, portion 38 of rod 36 extends in length such that substantially the entire length of rod 36 appears outwardly from external surface 40. This is due to the bias forces of spring 50 failing to be overcome by the presence of vacuum in area 18. Indicia lines 64 are disposed, in annular fashion, along the entire lengths of rod 36, and if desired, may be accompanied by work-like indicia, not shown. Thus, when indicia lines 64 or the word indicia appears aligned with surface 40, the user is apprised of the vacuum level then appearing at area 18.

Figure 4:
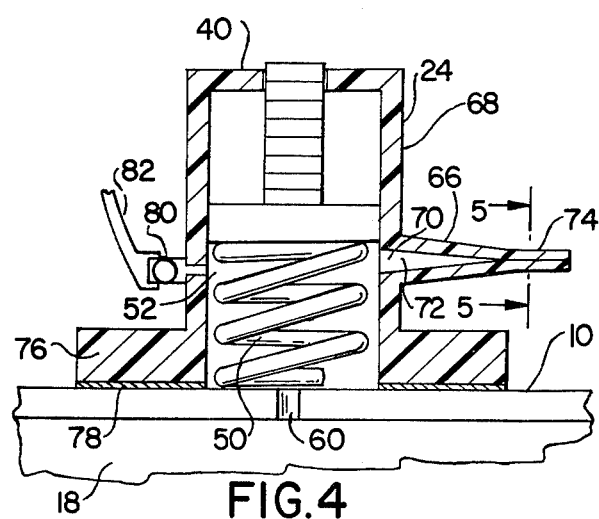
FIG. 4 is a side elevation, cross-sectional view of an alternate embodiment of the apparatus shown in FIG. 2.

FIG. 4 is an alternate embodiment of the apparatus shown in FIGS. 2 and 3 and depicts housing 24 having a flexible tubing-like protrusion 66 extending outwardly from exterior surface 68 thereof. Opening 70 communicates the passageway 72 within tubing 66. Free end 74, of tubing 66, is shown in a flattened condition. Opening 70 is shown communicating to cavity 52, such that passageway 72 ultimately communicates with hole 60 and thus to region 18. Housing 24 is shown provided with flange-like end 76 disposed opposite exterior surface 40. Flange 76 may be secured to lid 10 by a process such as heat sealing or by an adhesive. If such be the case, adhesive is applied in area 78, intermediate the outermost surface of lid 10 and the adjacent surface of flange 76.

Housing 24 may be applied to other portions of container 12, shown in FIG. 1, other than the lid 10 shown therein. If desired, check valve 26 shown in FIG. 1, may be incorporated as a part of housing 24, shown in dotted lines 80. Such check valve, as shown in dotted lines 80 or as shown in FIG. 1, as numeral 26, may be of the conventional all check variety, wherein positive pressure on the outside surface of cavity 22, shown in FIG. 1, causes the check valve to close and maybe overcome by vacuum being applied to tubing 28 as shown in FIG. 1, or the tubing depicted by dotted lines 82, as shown in FIG. 4.

Figure 5:
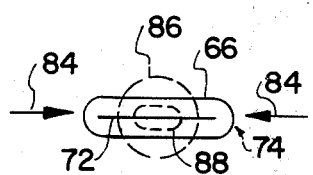
FIG. 5 is a side elevation, cross-sectional view taken along line 5—5, viewed the direction of arrows 5—5, of the apparatus shown in FIG. 4.

FIG. 5 illustrates flexible tubing 66 shown in its collapsed form adjacent the free end thereof. Passageway 72 in the area of end 74, is now totally collapsed so as to prevent the ingress of air into cavity 50, shown in FIG. 4. When it is desired to open up passageway 72, forces are applied in the direction of arrows 84 to the exterior of tubing 66 so as to cause the tubing, in the area of point 74, to assume the shape shown by dotted lines 86. Dotted lines 88 reflect the condition of passageway 72 when such forces are applied to tubing 66, venting the interior of container 12, shown in FIG. 1, to the atmosphere.

One of the advantages of the present invention is it is an apparatus which may be carried by the vacuumized container so as to continually indicate the pressure state within the container.

Another advantage is the inexpensive vacuum indicator, useful for industrial and home use, which may be either fabricated as a portion of a lid or attached thereto.

Still another advantage is the vacuum indicating device which is suitable to readily indicate the degree of required negative pressure for various types of foods designed to be stored within the container.

Yet another advantage is the indicating apparatus which also serves the purpose of relieving the negative pressure within the container both during the vacuumizing process or when it is desired to remove the container closure device.

A further advantage is the vacuum indicator and associated relief valve mechanism which is inexpensive to manufacture, simple to use, and reliable in nature.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A vacuum packing apparatus comprising a container, a lid, said container and said lid being disposed removably secured to one another, forming an enclosed cavity thereby,
   a first check valve, said first check valve pneumatically coupled to said cavity and carried by the assembly of said lid and said container, said first check valve being disposed biased into a closed condition when said cavity experiences negative pressure,
   a housing, said housing being carried by said assembly, said housing having a second cavity therewithin, said second cavity being pneumatically coupled to said cavity,
   a plunger, said plunger being disposed slideably secured within said second cavity,
   a rod, said rod being disposed fixedly to said plunger, said housing having an opening, said rod passing through said opening, means to bias said rod and said plunger towards said opening, whereby said plunger and said rod are disposed towards said cavity when said cavity is under the influence of a negative pressure therewithin,
   a second check valve, said second check valve being disposed fixedly secured to said housing, said second check valve comprising a flexible tube, said flexible tube having the distal-most end thereof disposed in a flattened condition, the other end of said flexible tube being disposed fixedly secured to said housing, adjacent and surrounding an opening therein, said opening of said housing being disposed adjacent said assembly and communicating to said second cavity.

2. The apparatus as claimed in claim 1 wherein said means to bias comprises a helical spring, one end of said helical spring disposed in touching engagement with said plunger, the other end of said helical spring being disposed in touching engagement with said housing.

3. The apparatus as claimed in claim 1, wherein said rod carries indicia.

4. The apparatus as claimed in claim 3, wherein said indicia comprises a plurality of lines, said plurality of lines being disposed in spaced apart annular relationship extending along the length of said rod.

5. The apparatus as claimed in claim 1, wherein said housing is carried by said lid.

6. The apparatus as claimed in claim 1, wherein said first check valve is carried by said lid.

7. The apparatus as claimed in claim 1, wherein said housing comprises a unitary apparatus disposed fixedly secured to said lid, a layer of adhesive, said layer of adhesive disposed intermediate said lid and said housing.

8. The apparatus as claimed in claim 1, further comprising another flexible tube, said another flexible tube having one end thereof removably secured to said first check valve, the other end of said another flexible tube being disposed coupled to a source of negative pressure.

9. The apparatus as claimed in claim 1, wherein said housing and said first check valve are each disposed fixedly secured to said lid in spaced apart relationship.

* * * * *